United States Patent Office 2,774,482
Patented Dec. 18, 1956

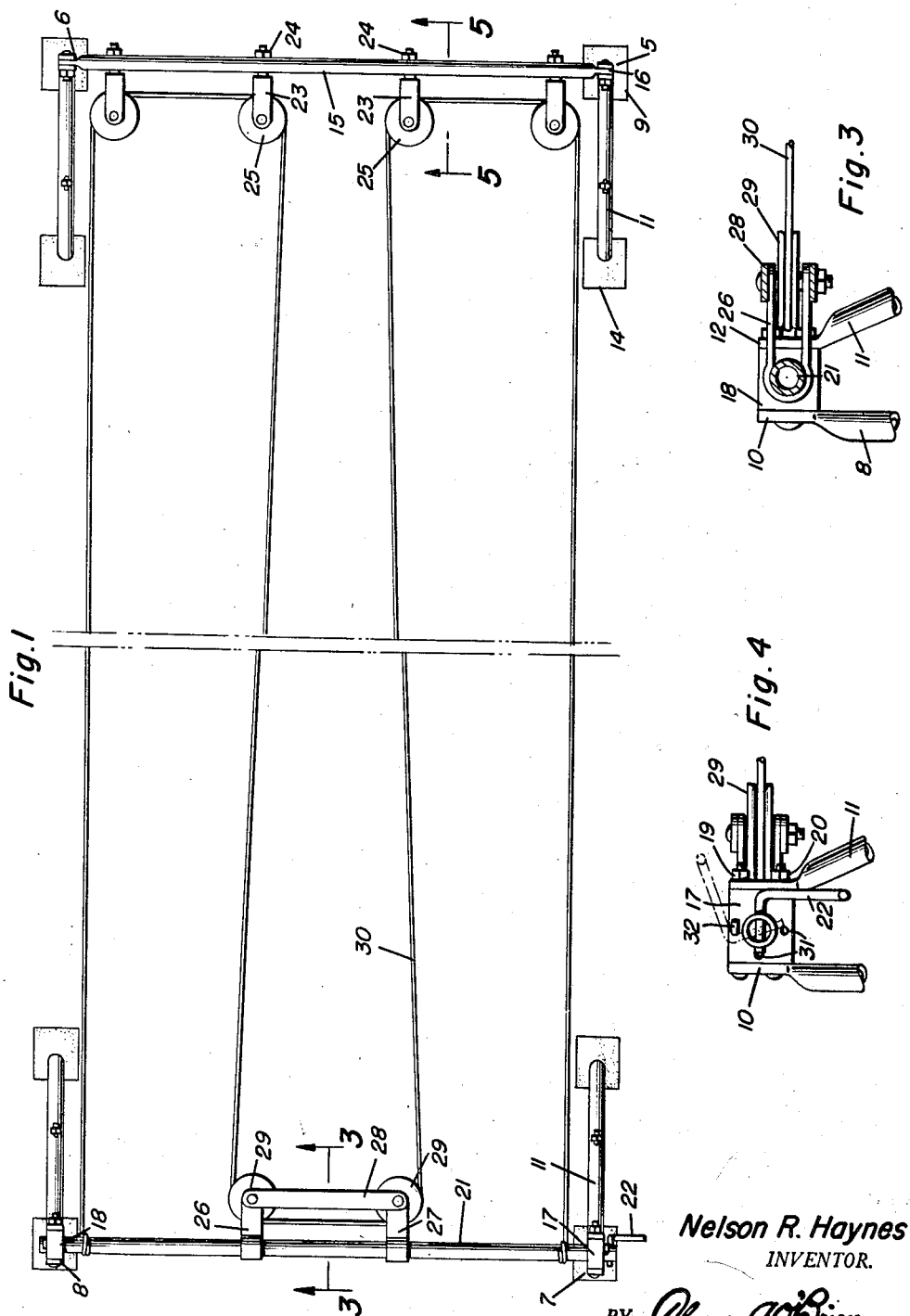

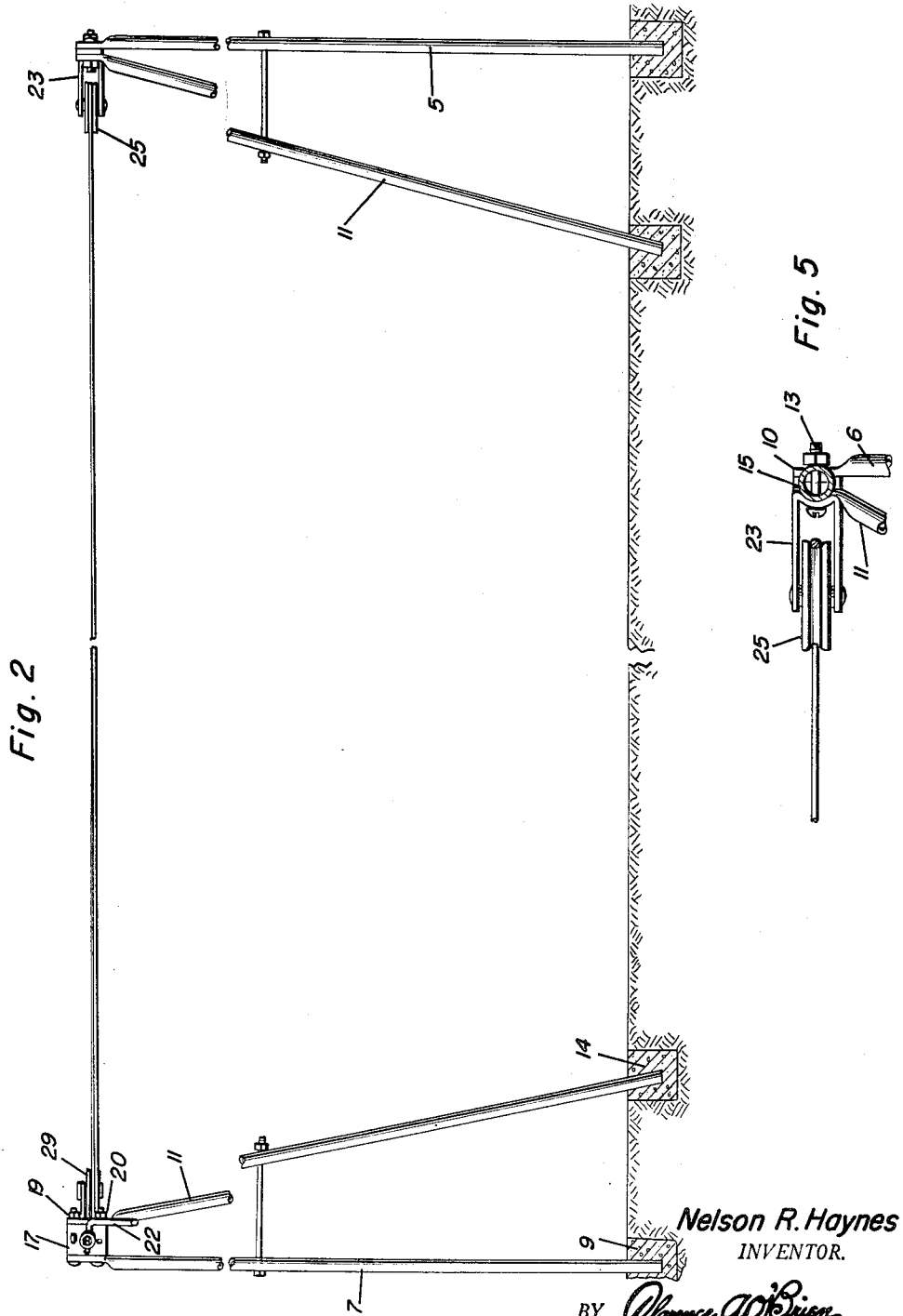

2,774,482

CLOTHESLINE SUPPORT

Nelson R. Haynes, Gothenburg, Nebr.

Application September 8, 1953, Serial No. 378,828

1 Claim. (Cl. 211—119.09)

The present invention relates to new and useful improvements in clothes line supports on which multiple parallel lengths of line may be supported.

An important object of the invention is to provide means for equally and simultaneously adjusting the tension of each length of line to take up slack therein.

Another object is to provide spaced apart parallel bars supported on posts and attaching pulleys to the bars on which the line is trained and providing bearing blocks in which one of the bars is rotatable and to which the ends of the line are attached for tightening the line.

A further object is to provide a device of this character of simple and practical construction, which is strong and durable, relatively inexpensive to manufacture and otherwise well adapted for the purpose for which the same is intended.

These together with other objects and advantages which will become subsequently apparent reside in the details of construction and operation as more fully herein described and claimed, reference being had to the accompanying drawings forming a part hereof, wherein like numerals refer to like parts throughout, and in which:

Figure 1 is a top plan view;

Figure 2 is a side elevational view;

Figure 3 is an enlarged sectional view taken on a line 3—3 of Figure 1;

Figure 4 is an enlarged fragmentary end elevational view of the mounting for one end of the rotatable bar or shaft; and Figure 5 is an enlarged sectional view taken on a line 5—5 of Figure 1.

Referring now to the drawings in detail, wherein for the purpose of illustration I have disclosed a preferred embodiment of my invention, the numerals 5 and 6 designate one pair of posts and 7 and 8 designate a second pair of posts and all of which are preferably constructed of tubular metal and having their lower ends embedded in concrete bases 9 to anchor the posts in the ground.

The upper end of each post is flattened, as shown at 10, and a brace 11 also of tubular metal is provided for each post and is formed with a flattened upper end 12 and attached to the upper end of the post by a bolt and nut 13. The lower end of each brace is also embedded in a concrete base 14.

A horizontal bar 15 of tubular metal has flattened ends 16 which are secured between the flattened ends 10 of posts 5 and 6 and the flattened ends 12 of the respective braces 11 by the bolts and nuts 13.

Bearing blocks 17 and 18 are secured between the flattened upper ends of the pair of posts 7 and 8 and their related braces by upper and lower bolts and nuts 19 and 20 and a second horizontal bar or shaft 21 is rotatably supported at its end portions in the bearing blocks. A crank handle 22 is attached to one end of the shaft for turning the latter and a locking pin 31 is selectively inserted in openings 32 in the adjacent bearing block 17 to lock the handle to prevent turning of the shaft.

A plurality of U-shaped pulley brackets 23 are attached to bar 15 by bolts and nuts 24 and on which pulleys 25 are mounted and a pair of U-shaped pulley brackets 26 and 27 are supported on the rotatable bar or shaft 21 to permit independent turning of the shaft. The ends of the pair of brackets 26 and 27 are connected to each other by connecting bars 28 to maintain said brackets uniformly spaced with respect to each other. Pulleys 29 are mounted in each bracket 26 and 27.

A wire or other flexible clothes line 30 is attached at each end to the rotatable bar or shaft 21 and the line is trained back and forth around the pulleys 25 and 29 to provide multiple flights or lengths of line which are tightened by turning the shaft by handle 22.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claim.

What is claimed as new is as follows:

A clothesline supporting structure comprising a first pair of posts and a second pair of posts supported in the ground in a rectangular arrangement, a brace for each post also supported in the ground and with the upper ends of the braces spaced from an adjacent post, bearing blocks secured between each of said first pair of posts and their related braces, a shaft rotatably supported in said bearing blocks, a bar secured between the second pair of posts and their related braces, brackets attached respectively to the shaft and bar and having pulleys supported thereby, said shaft being rotatable in its related bracket, a line trained over the pulleys and having its ends attached to the shaft, and means for turning the shaft for winding the line thereon to tighten the line.

References Cited in the file of this patent
UNITED STATES PATENTS

| | | |
|---|---|---|
| 73,019 | Martin | Jan. 7, 1868 |
| 699,736 | Woodyatt | May 13, 1902 |
| 806,401 | Dawson | Dec. 5, 1905 |
| 1,140,787 | Baeumle | May 25, 1915 |
| 1,501,088 | Anderson | July 15, 1924 |
| 1,513,445 | Cohrs | Oct. 28, 1924 |
| 2,490,154 | Pearson | Dec. 6, 1949 |
| 2,496,549 | Larson | Feb. 7, 1950 |